United States Patent
Li et al.

(10) Patent No.: US 7,757,482 B2
(45) Date of Patent: Jul. 20, 2010

(54) VARIABLE GEOMETRY EXHAUST COOLER

(75) Inventors: Jianwen Li, Canton, MI (US); Rahul Mital, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 314 days.

(21) Appl. No.: 11/677,133

(22) Filed: Feb. 21, 2007

(65) Prior Publication Data
US 2008/0196408 A1    Aug. 21, 2008

(51) Int. Cl.
*F01N 3/00* (2006.01)
(52) U.S. Cl. ............................. 60/298; 60/308; 60/315; 60/317; 60/319
(58) Field of Classification Search ................... 60/298, 60/308, 315, 316, 317, 319
See application file for complete search history.

(56) References Cited

U.S. PATENT DOCUMENTS

| | | | | |
|---|---|---|---|---|
| 1,217,615 A * | 2/1917 | McDowell | .................... | 181/262 |
| 2,506,810 A * | 5/1950 | Ospina-Racines | ........... | 123/1 R |
| 2,913,871 A * | 11/1959 | Bradshaw | ................... | 239/399 |
| 3,043,097 A * | 7/1962 | Inman et al. | ................. | 417/168 |
| 3,201,207 A * | 8/1965 | Lentz | ........................ | 422/112 |
| 3,469,566 A * | 9/1969 | Wilkinson et al. | ............ | 60/317 |
| 3,543,510 A * | 12/1970 | Kaufmann, Jr. | ............... | 60/308 |
| 3,657,878 A * | 4/1972 | Kaufmann, Jr. | ............... | 60/308 |
| 3,708,961 A * | 1/1973 | Kimmel, III | .................. | 96/372 |
| 3,846,981 A * | 11/1974 | Paczkowski | ................. | 60/286 |
| 3,857,458 A * | 12/1974 | Ohtani et al. | ................ | 181/262 |
| 4,177,640 A * | 12/1979 | Kuroda et al. | .................. | 60/274 |
| 4,227,651 A * | 10/1980 | Abe | ........................... | 239/428 |
| 4,313,523 A * | 2/1982 | Copen | ......................... | 181/263 |
| 4,335,575 A * | 6/1982 | Pagliuca | ....................... | 60/319 |
| 4,339,918 A * | 7/1982 | Michikawa | ................... | 60/316 |
| 4,462,208 A * | 7/1984 | Hicks et al. | .................... | 60/286 |
| 5,282,361 A * | 2/1994 | Sung | ............................ | 60/315 |
| 5,524,434 A * | 6/1996 | Ma | ............................. | 60/290 |
| 6,167,700 B1 * | 1/2001 | Lampert | ...................... | 60/307 |
| 6,789,385 B2 * | 9/2004 | Glover | ......................... | 60/293 |
| 7,040,084 B2 | 5/2006 | Ament | | |
| 7,104,048 B2 | 9/2006 | Brown | | |
| 7,107,765 B2 * | 9/2006 | Fults et al. | ..................... | 60/316 |
| 7,281,530 B2 * | 10/2007 | Usui | ...................... | 123/568.17 |
| 2006/0179815 A1 | 8/2006 | Means | | |

* cited by examiner

*Primary Examiner*—Tu M Nguyen

(57) ABSTRACT

The present invention provides an exhaust cooler mounted to a tailpipe for receiving exhaust gas. The exhaust cooler includes a jet pump connectable to the tailpipe and a nozzle connectable to the tailpipe. The nozzle defines a nozzle opening between the tailpipe and the jet pump for communicating the exhaust gas from the tailpipe to the jet pump. A first member is included that is moveable between a closed position and an open position, the open position defining a first opening between the tailpipe and the jet pump for communicating the exhaust gas from the tailpipe to the jet pump.

6 Claims, 3 Drawing Sheets

US 7,757,482 B2

VARIABLE GEOMETRY EXHAUST COOLER

FIELD

The present disclosure relates to exhaust coolers, and more particularly to a variable geometry exhaust cooler.

BACKGROUND

The statements in this section merely provide background information related to the present disclosure and may or may not constitute prior art.

Diesel engine systems are popular due to their generally high efficiency relative to other kinds of internal combustion engines. This efficiency is due, in part, to the increased compression ratio of the Diesel combustion process and the higher energy density of Diesel fuel. However, the Diesel combustion process does produce particulates that are carried in the exhaust gas produced by the Diesel engine system.

A Diesel particulate filter is often used to remove these particulates from the exhaust gases. Typically, the Diesel particulate filter is coupled to the exhaust system downstream of the Diesel engine. The Diesel particulate filter receives the exhaust gas and filters particulates out of the exhaust gas. While useful for its intended purpose, the Diesel particulate filter can become full over time, and if not cleaned, the operating effectiveness of the Diesel particulate filter can be degraded.

Another solution known in the art is to use a regeneration process to remove particulates trapped in the Diesel particulate filter. These regeneration processes may take various forms, such as, for example, exhaust gas recirculation or using post-combustion fuel injected into the cylinder in order to raise the temperature of the exhaust gas stream. An exemplary regeneration process is found in commonly owned U.S. Pat. No. 7,104,048 B2, hereby incorporated by reference as if fully disclosed herein. These regeneration processes typically heat the exhaust gasses to a high temperature in order to burn the particulates from the Diesel particulate filter.

During conditions when the Diesel engine system is in an idle state, it is desirable to cool the exhaust gasses before they are expelled into the environment. Accordingly, an exhaust gas cooler may be coupled to the Diesel engine system downstream of the Diesel particulate filter to cool the exhaust gas. The exhaust gas cooler is operable to mix the hot exhaust gas with the cooler ambient air, thereby reducing the temperature of the exhaust gas. To do so, however, the amount of exhaust gas entering the exhaust cooler is typically restricted such that sufficient cooling can take place. This restriction of the exhaust gas can lead to back pressure, lowered horsepower, and other inefficiencies in the Diesel engine system when the Diesel engine system is running at a non-idle state and producing large amounts of exhaust gas. Accordingly, there is room in the art for an exhaust cooler that is operable to vary the amount of exhaust gas entering the exhaust cooler based on the operating state of the Diesel engine system.

SUMMARY

The present invention provides an exhaust cooler mounted to a tailpipe for receiving exhaust gas.

In one aspect of the present invention the exhaust cooler includes a jet pump connectable to the tailpipe and a nozzle connectable to the tailpipe. The nozzle defines an opening between the tailpipe and the jet pump for communicating the exhaust gas from the tailpipe to the jet pump. A first member is included that is moveable between a closed position and an open position, the open position defining a first opening between the tailpipe and the jet pump for communicating the exhaust gas from the tailpipe to the jet pump.

In another aspect of the present invention the first member is a plate pivotally connectable to the tailpipe.

In yet another aspect of the present invention a hinge is connectable between the tailpipe and the first member to allow the first member to pivot between the open and the closed positions.

In still another aspect of the present invention a second member is included that is moveable between a closed position and an open position, the open position defining a second opening between the tailpipe and the jet pump for communicating the exhaust gas from the tailpipe to the jet pump.

In still another aspect of the present invention the first member and the second member are each semi-circular in shape and are sized to fit overtop the nozzle opening.

In still another aspect of the present invention the first opening and the second opening are each semi-circular in shape.

In still another aspect of the present invention when the first member and the second member are in the closed position, the first opening and the second opening cooperate to form a circular shaped opening.

In still another aspect of the present invention the circular shaped opening has a diameter less than a diameter of the nozzle opening.

In still another aspect of the present invention a biasing member is connectable to the tailpipe to bias the first member to the closed position.

In still another aspect of the present invention the biasing member is a torsional spring.

In still another aspect of the present invention the first member is a valve.

In still another aspect of the present invention the valve is a reed type valve.

In still another aspect of the present invention the nozzle has a frusto-conical shape and the valve is positioned on an outer surface of the frusto-conical nozzle.

In still another aspect of the present invention a plurality of reed valves are spaced equidistance along the outer surface of the frusto-conical nozzle.

In still another aspect of the present invention the jet pump is connectable to the tailpipe by a plurality of struts.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3A:
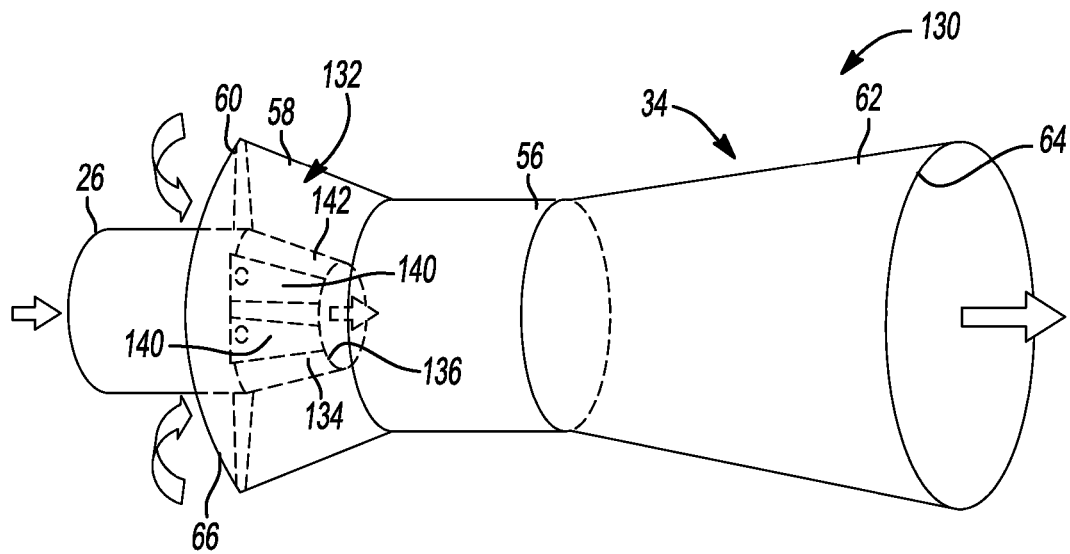
Figure 3B:
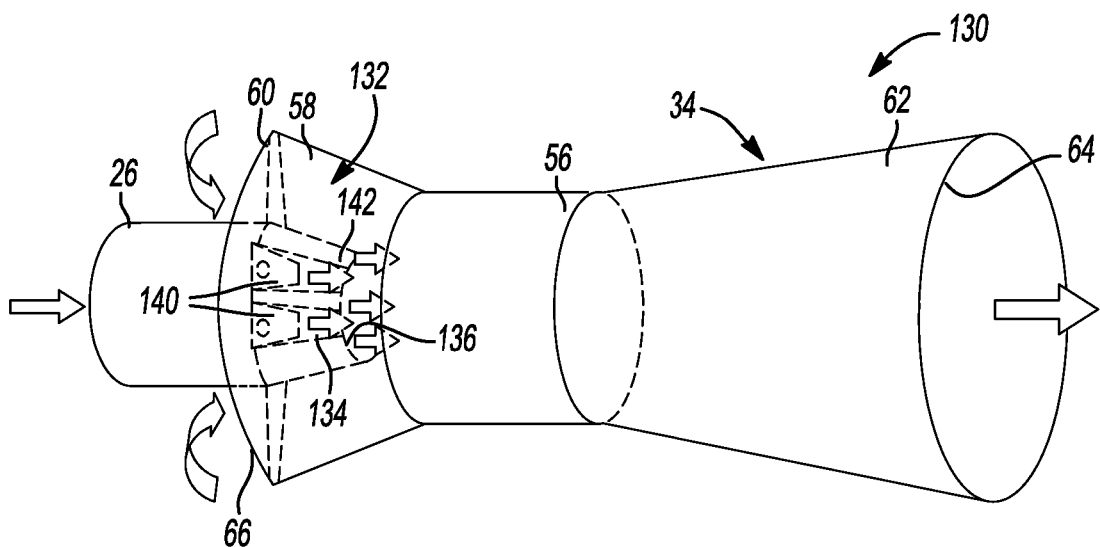

FIG. 3A is an enlarged schematic side view of a second embodiment of the variable exhaust cooler of the present invention having valves in a closed position when the exemplary Diesel engine system is in an idle state; and FIG. 3B is an enlarged schematic side view of the second embodiment of the variable exhaust cooler of the present invention having valves in an open position when the exemplary Diesel engine system is in a non-idle state.

DETAILED DESCRIPTION

The following description is merely exemplary in nature and is not intended to limit the present disclosure, application, or uses.

Figure 1:
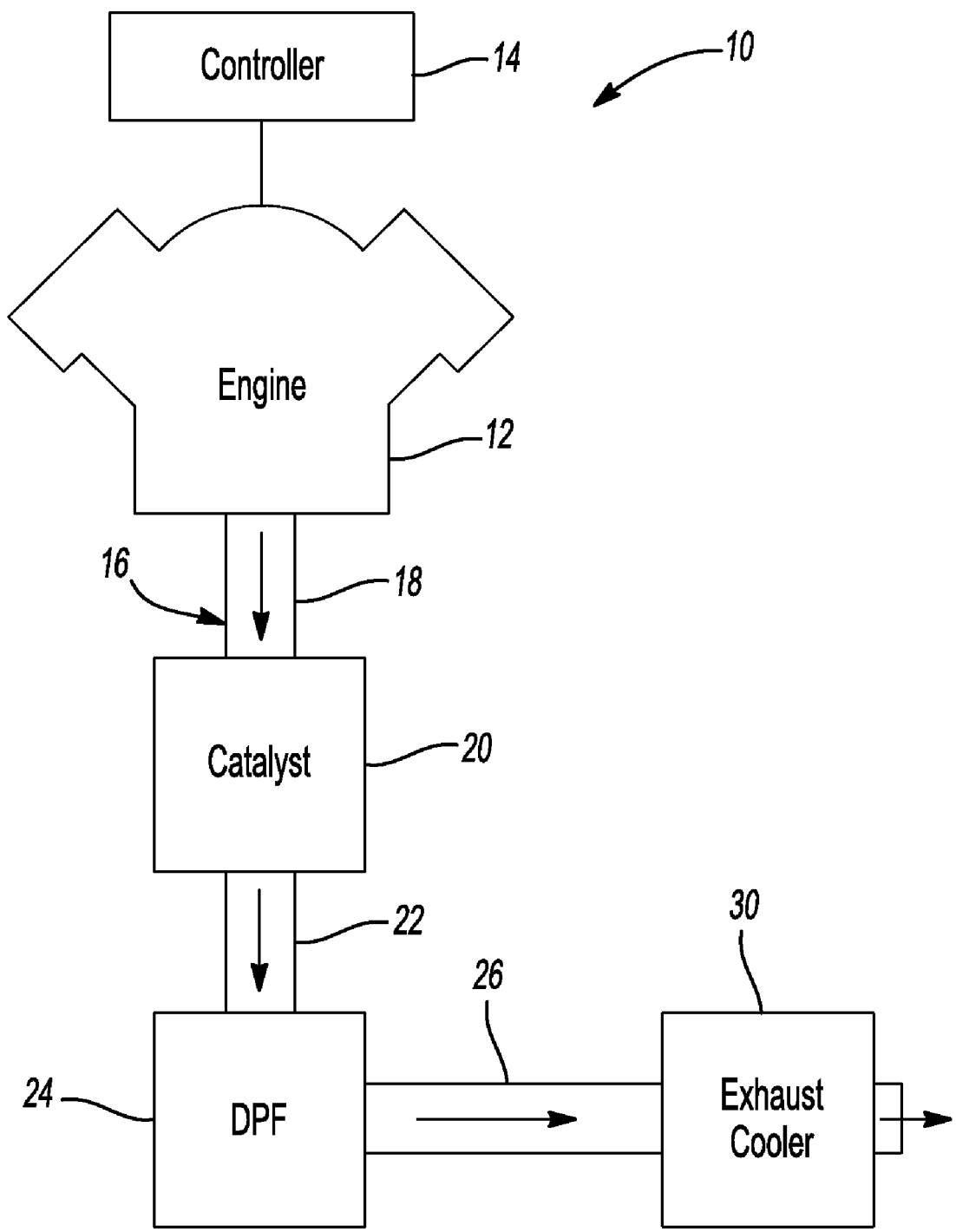
FIG. 1 is a schematic view of an exemplary Diesel engine system having a variable exhaust cooler according to the principles of the present invention.

With reference to FIG. 1, an exemplary Diesel engine system is illustrated and generally indicated by reference number 10. The Diesel engine system 10 is preferably employed in a motor vehicle (not shown), though the Diesel engine system 10 may be used in various other applications without departing from the scope of the present invention. The Diesel engine system 10 generally includes a Diesel engine 12. The Diesel engine 12 is in electronic communication with an engine controller 14. The engine controller 14 is operable to control the Diesel engine 12 based on various parameters.

The Diesel engine 12 is operable to combust Diesel fuel (not shown) in a combustion process within the Diesel engine 12. The by-product of this combustion process is an exhaust gas. The exhaust gas is discharged from the Diesel engine 12 as an exhaust gas stream into an exhaust pipe 16, as indicated by the arrows in FIG. 1.

The exhaust pipe 16 includes a first section 18 that communicates the exhaust gas from the Diesel engine 12 to a catalyst 20 located downstream of the Diesel engine 12. The catalyst 20 is mounted to the exhaust pipe 16. The catalyst 20 may be any exhaust scrubbing device, such as, for example, an NOx filter. The catalyst 20 is operable to filter the exhaust gas to meet applicable emissions standards.

A second section 22 of the exhaust pipe 16 carries the exhaust gas from the catalyst 20 to a Diesel particulate filter 24. The Diesel particulate filter 24 is mounted to the exhaust pipe 16 and is located downstream of the catalyst 20 and the Diesel engine 12. The Diesel particulate filter 24 filters the exhaust gas stream and traps particulates therein. The Diesel particulate filter 24 may take various forms without departing from the scope of the present invention. For example, the Diesel particulate filter 24 may include a ceramic structure through which the exhaust gas stream passes. The particulates are trapped and accumulate on the walls of the ceramic structure until such time as they are burned off in a regeneration process using hot exhaust gasses.

The exhaust gas stream passes from the Diesel particulate filter 24 to a tailpipe section 26 of the exhaust pipe 16. An exhaust cooler 30 is mounted to an end of the tailpipe section 26. As will be described in greater detail below, the exhaust cooler 30 acts to cool the exhaust gas stream before the exhaust gas stream enters the surrounding environment.

Figure 2A:
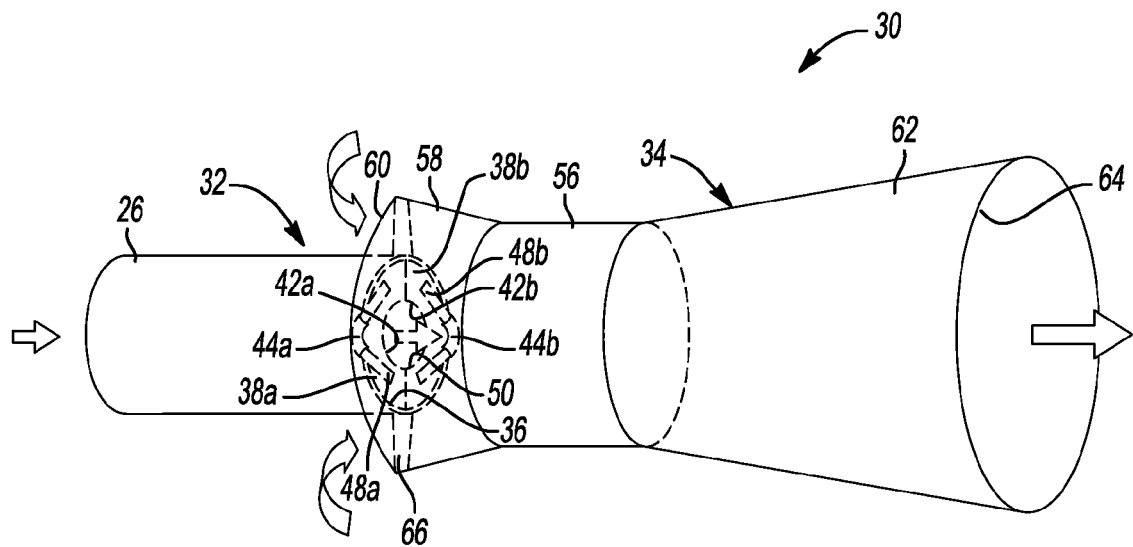
FIG. 2A is an enlarged schematic side view of the variable exhaust cooler of the present invention having throttle plates in a closed position when the exemplary Diesel engine system is in an idle state.

Turning now to FIG. 2A, the exhaust gas cooler 30 generally includes a variable geometry nozzle assembly 32 coupled with a jet pump 34. The nozzle assembly 32 is disposed on an end of the tailpipe section 26 and defines an opening 36. Preferably, the opening 36 has a diameter equal to the diameter of the tailpipe section 26. However, it should be appreciated that the opening 36 may have a diameter different than the diameter of the tailpipe section 26 without departing from the scope of the present invention.

The nozzle assembly 32 further includes a first throttle plate 38A and a second throttle plate 38B. The throttle plates 38A and 38B are each generally semi-circular in shape and each have an outer diameter larger than the diameter of the opening 36. Alternatively, the throttle plates 38A and 38B could have an outer diameter less than the opening 36 such that the throttle plates 38A and 38B fit within the opening 36. The throttle plates 38A and 38B each respectively include a semi-circular opening or cut out 42A and 42B. The semi-circular cut outs 42A and 42B are concentric with the generally semi-circular shape of the throttle plates 38A and 38B, and each semi-circular cut out 42A and 42B has a diameter less than the outer diameter of the throttle plates 38A and 38B.

The throttle plates 38A and 38B are each pivotally mounted to the tailpipe section 26 at the opening 36. In the example provided, a first hinge 44A pivotally couples the first throttle plate 38A to the tailpipe section 26. The first hinge 44A is mounted to the tailpipe section 26 and is mounted to the circumferential center, or apex, of the semi-circular outer edge of the first throttle plate 38A. A second hinge 44B pivotally couples the second throttle plate 38B to the tailpipe section 26. The second hinge 44B is mounted to the tailpipe section 26 at a position opposite the first hinge 44A. The second hinge 44B is also mounted to the circumferential center, or apex, of the semi-circular outer edge of the second throttle plate 38B. While hinges 44A and 44B have been illustrated as pivotally coupling the throttle plates 38A and 38B to the tailpipe section 26, it should be appreciated that various other mechanisms that allow the throttle plates 38A and 38B to pivot relative to the tailpipe section 26 may be employed without departing from the scope of the present invention.

The throttle plates 38A and 38B are respectively biased to a closed position by a first biasing member 48A and a second biasing member 48B. In the preferred embodiment, the biasing members 48A and 48B are torsional springs, though various other biasing devices may be employed without departing from the scope of the present invention.

The closed position of the throttle plates 38A and 38B is illustrated in FIG. 2A. When in the closed position, the throttle plates 38A and 38B are positioned to at least partially cover the opening 36. Furthermore, the cut outs 42A and 42B cooperate to define a reduced opening 50. The reduced opening 50 has a diameter less than the diameter of the opening 36.

The jet pump 34 includes a cylindrical pipe portion 56. An intake portion 58 is mounted on one end of the cylindrical pipe portion 56. The intake portion 58 is generally frusto-conical in shape and defines an intake opening 60. An output portion 62 is mounted on an opposite end of the cylindrical pipe portion 56. The output portion 62 is also generally frusto-conical in shape and defines an exhaust output 64 at an end thereof. In an alternate embodiment, the jet pump 34 includes only the cylindrical pipe portion 56.

The jet pump 34 is mounted to the tailpipe section 26 by struts 66. The struts 66 extend from the intake portion to the tailpipe section 26. The jet pump 34 extends out from the tailpipe section 26 away from the nozzle assembly 32.

With reference to FIG. 1 and continued reference to FIG. 2A, in order to clean the Diesel particulate filter 24, hot exhaust gas is passed through the exhaust pipe 16, through the Diesel particulate filter 24, and on to the exhaust cooler 30. When the Diesel engine 12 is in an idle state, the hot exhaust gas passes through the nozzle opening 50. Cooler ambient air is sucked through the intake opening 60 of the jet pump 34. The hot exhaust gas and the cooler ambient air circulate and mix within the cylindrical pipe portion 56 and the output portion 62. The hot exhaust gas is cooled and exits the exhaust cooler 30 from the exhaust output 64. Hot exhaust ranging in temperature from 450-600 degrees Celsius at the nozzle opening 50 may be cooled to less than 300 degrees Celsius at the exhaust output 64.

As the exhaust gas stream leaves the Diesel engine 12, the exhaust gas stream flows through the exhaust pipe 16. As the exhaust gas stream 12 reaches the exhaust cooler 30, the exhaust gas stream exerts a pressure on the throttle plates 38A and 38B. During idle conditions, the exhaust gas stream pressure is less than the force exerted on the throttle plates 38A and 38B by the biasing members 46A and 46B. Accordingly, the throttle plates 38A and 38B remain in the closed position and the nozzle opening 50 speeds up the exhaust gas as it passes through the restricted nozzle opening 50, thereby entraining more air in the jet pump 34 and achieving increased cooling from the increased volume of entrained ambient air.

Figure 2B:
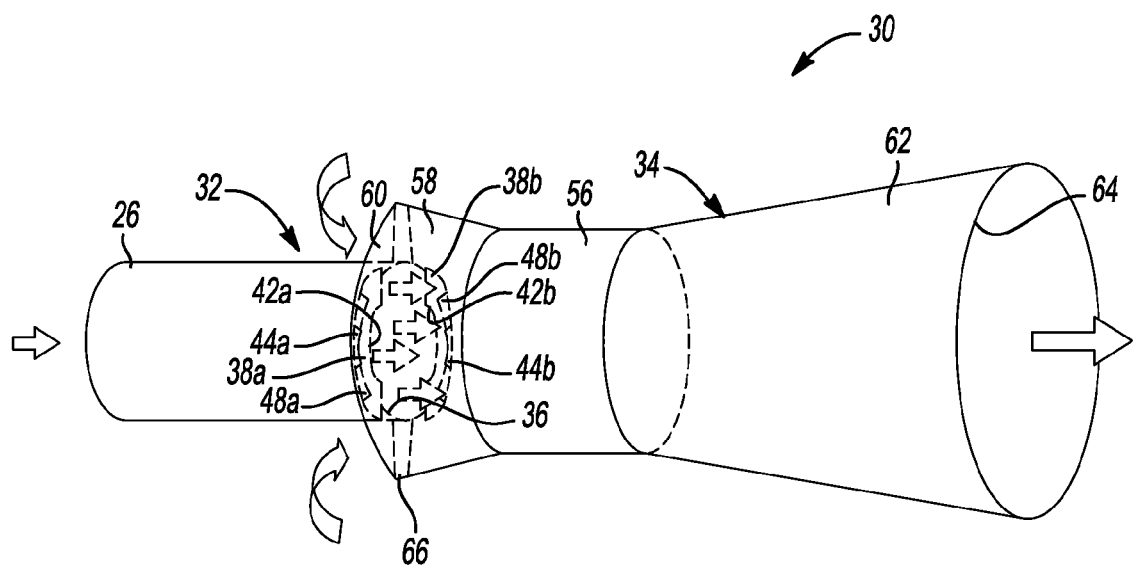
FIG. 2B is an enlarged schematic side view of the variable exhaust cooler of the present invention having throttle plates in an open position when the exemplary Diesel engine system is in a non-idle state.

When the Diesel engine 12 is running at non-idle conditions, the amount of exhaust gas produced by the Diesel engine 12 increases, and accordingly the pressure of the exhaust gas stream on the throttle plates 38A and 38B increases. This exhaust gas pressure is operable to move the throttle plates 38A and 38B into an open position. The open position of the throttle plates 38A and 38B is illustrated in FIG. 2B. When the exhaust stream pressure exceeds the force exerted by the biasing members 46A and 46B on the throttle plates 38A and 38B, the throttle plates 38A and 38B are pivoted against the biasing members 46A and 46B on the hinges 44A and 44B. As the throttle plates 38A and 38B are pivoted away from each other, the opening from the tailpipe section 26 into the jet pump 34 increases in size from the area provided by the nozzle 50 to the area provided by the opening 36. Accordingly, a larger amount of exhaust gas is allowed to pass from the nozzle assembly 30 into the jet pump 34, thereby reducing back pressure and other inefficiencies at non-idle speeds.

With reference to FIG. 3A, a second embodiment of the exhaust gas cooler is generally indicated by reference number 130. The exhaust gas cooler 130 generally includes the jet pump 34, as described in FIGS. 2A and 2B, and a nozzle assembly 132.

The nozzle assembly 132 is disposed on an end of the tailpipe section 26 and includes a nozzle 134. The nozzle 134 has a generally frusto-conical shape and is hollow such that an interior of the nozzle 134 communicates with the tailpipe section 26 to receive the exhaust gas stream. The nozzle 134 further defines an outlet 136 at an end thereof. The outlet 136 has a diameter less than the diameter of the tailpipe section 26 and therefore restricts the amount of exhaust gas passing from the tailpipe section 26 to the jet pump 34.

A plurality of valves 140, only two of which are shown, are located around an outer surface 142 of the nozzle 134. The valves 140 are in communication with the interior of the nozzle 134 and in turn the exhaust gas stream within the tailpipe section 26. In the preferred embodiment, six to eight valves are spaced evenly around the outer surface 142 of the nozzle 134. However, it should be appreciated that any number of valves 140 may be employed with the present invention. The valves 140 are moveable between a closed position, as shown in FIG. 3A, and an open position, as shown in FIG. 3B. The valves 140 are biased toward the closed position. In the preferred embodiment, the valves 140 are reed type valves. However, it should be appreciated that various other types of valves may be employed with the present invention.

During idle conditions, the exhaust gas stream pressure is not sufficient to open the valves 140, and the valves remain in the closed position as illustrated in FIG. 3A. Accordingly, the outlet 136 speeds up the exhaust gas stream as it passes through the restricted opening of the outlet 136, thereby entraining more air in the jet pump 34 and achieving increased cooling from the increased volume of entrained ambient air. When the Diesel engine 12 is running at non-idle conditions, the amount of exhaust gas produced by the Diesel engine 12 increases, and accordingly the pressure of the exhaust gas stream on the valve 140 increases. This exhaust gas pressure is operable to move the valves 140 into the open position, as illustrated in FIG. 3B. Accordingly, a larger amount of exhaust gas is allowed to pass from the nozzle assembly 130 into the jet pump 34, thereby reducing back pressure and other inefficiencies at non-idle speeds. This allows the exhaust gas cooler 130 to automatically adjust to the operating state of the engine 12.

The description of the invention is merely exemplary in nature and variations that do not depart from the gist of the invention are intended to be within the scope of the invention. Such variations are not to be regarded as a departure from the spirit and scope of the invention.

What is claimed is:

1. An exhaust cooler mounted to a tailpipe for receiving exhaust gas, the exhaust cooler comprising:
   a jet pump disposed downstream of the tailpipe;
   a nozzle connected to the tailpipe, the nozzle defining a nozzle opening between the tailpipe and the jet pump for communicating the exhaust gas from the tailpipe to the jet pump, wherein the nozzle has a frusto-conical shape; and
   a first member moveable between a closed position and an open position, the open position defining a first opening between the tailpipe and the jet pump for communicating the exhaust gas from the tailpipe to the jet pump, wherein the first member is a reed type valve, and wherein the valve is positioned on an outer surface of the nozzle.

2. The exhaust gas cooler of claim 1 further comprising a plurality of reed valves spaced equidistance along the outer surface of the frusto-conical nozzle.

3. The exhaust cooler of claim 1 wherein the jet pump is connected to the tailpipe by a plurality of struts.

4. The exhaust gas cooler of claim 1 further comprising a biasing member connected to the tailpipe to bias the first member to the closed position.

5. The exhaust gas cooler of claim 4 wherein the biasing member is a torsional spring.

6. An exhaust cooler mounted to a tailpipe for receiving exhaust gas, the exhaust cooler comprising:
   a jet pump disposed downstream of the tailpipe, the jet pump defining at least one opening for receiving non-exhaust gas;
   a nozzle connected to the tailpipe and disposed between the tailpipe and the jet pump, the nozzle defining a nozzle opening between the tailpipe and the jet pump for communicating the exhaust gas from the tailpipe to the jet pump, wherein the nozzle has a frusto-conical shape; and
   a reed type valve positioned on an outer surface of the nozzle, the reed type valve moveable between a closed position and an open position, wherein the reed type valve defines a first opening in communication with the nozzle and the jet pump when the reed type valve is in the open position, wherein the reed type valve defines a second opening in communication with the nozzle and the jet pump when the reed type valve is in the closed position, and wherein the second opening is smaller than the nozzle opening.

\* \* \* \* \*